United States Patent
Stanfill et al.

(10) Patent No.: US 10,262,120 B1
(45) Date of Patent: Apr. 16, 2019

(54) PROVIDING DISPLAY OUTPUTS RESPONSIVE TO RECORD DATA

(71) Applicant: Squirrels LLC, North Canton, OH (US)

(72) Inventors: David Stanfill, Bolivar, OH (US); Andrew Gould, North Canton, OH (US)

(73) Assignee: SQUIRRELS LLC, North Canton, OH (US)

( * ) Notice: Subject to any disclaimer, the term of this patent is extended or adjusted under 35 U.S.C. 154(b) by 602 days.

(21) Appl. No.: 14/938,931

(22) Filed: Nov. 12, 2015

Related U.S. Application Data

(60) Provisional application No. 62/080,642, filed on Nov. 17, 2014.

(51) Int. Cl.

| | |
|---|---|
| *G06F 15/16* | (2006.01) |
| *G06F 21/31* | (2013.01) |
| *G06F 3/0484* | (2013.01) |
| *H04W 4/80* | (2018.01) |
| *H04L 29/08* | (2006.01) |
| *H04W 4/70* | (2018.01) |
| *H04W 8/00* | (2009.01) |
| *H04L 29/06* | (2006.01) |

(Continued)

(52) U.S. Cl.
CPC .......... *G06F 21/31* (2013.01); *G06F 3/04842* (2013.01); *H04W 4/80* (2018.02); *H04L 61/2007* (2013.01); *H04L 61/2514* (2013.01); *H04L 65/1016* (2013.01); *H04L 67/025* (2013.01); *H04L 67/141* (2013.01); *H04W 4/70* (2018.02); *H04W 8/005* (2013.01); *H04W 80/04* (2013.01)

(58) Field of Classification Search
CPC ............ G06Q 30/0252; G06Q 20/3276; H04L 63/0853; H04L 67/025; H04L 67/16; H04L 67/141; H04L 65/1016; H04L 61/2007; H04L 61/2514; H04N 5/23206; H04N 1/32122; G06F 21/31; G06F 3/04842; H04W 4/80; H04W 4/70; H04W 8/005; H04W 80/04
USPC .......... 726/5, 1; 455/557; 235/375; 709/227, 709/224, 228; 358/1.14; 713/167
See application file for complete search history.

(56) References Cited

U.S. PATENT DOCUMENTS

| | | | |
|---|---|---|---|
| 2008/0081666 A1* | 4/2008 | Masera | ................. H04L 67/025 455/557 |
| 2012/0061458 A1* | 3/2012 | Bahr | ................. G06K 7/10792 235/375 |

(Continued)

*Primary Examiner* — Jungwon Chang
(74) *Attorney, Agent, or Firm* — Ralph E. Jocke; Walker & Jocke

(57) ABSTRACT

Access to a device that is associated with a display such as a visual projection device, is permitted based on data included in data bearing records. The device operates as a receiver and has an address associated with receiver circuitry in the device. The device operates to generate at least one data bearing record including a quick connect code value that corresponds to the receiver device address. The quick connect code value in the data bearing record is used by a transmitter device to send wireless signals to the receiver device to produce visual outputs from the display associated with the receiver that correspond to current visual outputs from a display associated with the transmitter.

23 Claims, 6 Drawing Sheets

(51) Int. Cl.
*H04W 80/04* (2009.01)
*H04L 29/12* (2006.01)

(56) References Cited

U.S. PATENT DOCUMENTS

| | | | |
|---|---|---|---|
| 2014/0001253 A1* | 1/2014 | Smith | G06Q 20/3276 235/375 |
| 2014/0115331 A1* | 4/2014 | Dharawat | H04W 12/02 713/167 |
| 2014/0229251 A1* | 8/2014 | Lim | G06Q 30/0252 705/14.5 |
| 2014/0282924 A1* | 9/2014 | Singhal | H04L 63/0853 726/5 |
| 2014/0310420 A1* | 10/2014 | Kuo | H04N 5/23206 709/227 |
| 2014/0333963 A1* | 11/2014 | Nakamura | H04L 67/16 358/1.15 |
| 2014/0369169 A1* | 12/2014 | Iida | H04B 11/00 367/135 |
| 2015/0124281 A1* | 5/2015 | Watanabe | H04N 1/32122 358/1.14 |
| 2016/0028708 A1* | 1/2016 | Guthery | H04L 63/04 726/1 |

* cited by examiner

PROVIDING DISPLAY OUTPUTS RESPONSIVE TO RECORD DATA

CROSS REFERENCE TO RELATED APPLICATION

This application claims benefit pursuant to 35 U.S.C. § 119(e) of U.S. Provisional Application 62/080,642 filed Nov. 17, 2014, the disclosure of which is incorporated herein by reference in its entirety.

TECHNICAL FIELD

This disclosure relates to permitting access to operate equipment based on data bearing record data which is classified in U.S. Class 235, Subclass 382; CPIC G 06 K.

BACKGROUND

Devices that include visual displays or which can operate to provide outputs that can be used to generate visual outputs through visual displays are useful for providing visual information to users. Such devices may be used to provide visual outputs that can be perceived by one or more persons. Such devices may include video projectors or devices that provide signals to video projectors for purposes of producing outputs.

Such devices may receive signals for producing visual outputs from a plurality of different sources. Often for presentation sessions, it is desirable to receive a display of visual outputs provided by one or more authorized sources. Such arrangements may present challenges and may benefit from improvements.

SUMMARY

An exemplary embodiment of a display system includes a receiver that is a device that includes receiver circuitry. The receiver circuitry is operative to cause visual outputs to be produced on a display that is in operative connection with the receiver circuitry. The exemplary receiver circuitry has the capability to receive signals transmitted in a wireless network at a receiver network address associated with the receiver circuitry. The signals received at the network address are utilized by the receiver circuitry to output display signals that produce visual outputs on a display.

The receiver circuitry is in operative connection with at least one receiver input device. The receiver circuitry is operative responsive to at least one input to the at least one receiver input device to produce a quick connect (QC) code value. The QC code value corresponds to the receiver network address. The QC code value in the exemplary embodiment includes substantially fewer characters than the receiver network address.

The exemplary receiver circuitry is operative to cause at least one data bearing record to be produced which includes the QC code value. The at least one data bearing record may include an output through an output device such as a visual display in connection with the receiver. Alternatively, the at least one data bearing record may include an output presented through a printer or on other record media. The record may include in some embodiments, the QC code value in human readable characters and in other embodiments the record may include in addition or only machine readable characters such as one or two dimensional bar codes or other characters that can be read and interpreted by a machine.

In the exemplary arrangement, the QC code value from the at least one data bearing record produced through operation of the receiver circuitry is received through operation of transmitter circuitry of a transmitter that is separate from the receiver. The transmitter includes the transmitter circuitry. The transmitter circuitry may be in operative connection with a transmitter display associated with the transmitter and with at least one input device such as a camera, reader device, microphone, keypad or other type of input device. In some arrangements, the camera or other reader device is usable to read the data from the at least one data bearing record. In other exemplary arrangements, the at least one input device of the transmitter may include at least one input device usable to receive inputs corresponding to the record data including the QC code value.

In the exemplary embodiment the display of the transmitter is operative to provide visual outputs. The transmitter circuitry is operative to cause the QC code value to be used to resolve the network address of the receiver. The transmitter circuitry is operative to cause network signals corresponding to the visual outputs currently being output through the display of the transmitter to be sent to the network address associated with the receiver circuitry. The receiver circuitry is operative responsive to the received network signals to cause visual outputs corresponding to the current visual outputs through the transmitter display to be output through the display associated with the receiver. The transmitter is effective to communicate synchronously with the receiver including a receiver that has circuitry configured to block the multicast domain name system traffic. In this way, the visual outputs currently being presented on the display of the transmitter are readily displayed and output through the display associated with the receiver. Such display access may be useful in activities such as teaching, group discussions, or presentation environments.

DETAILED DESCRIPTION

Figure 1:
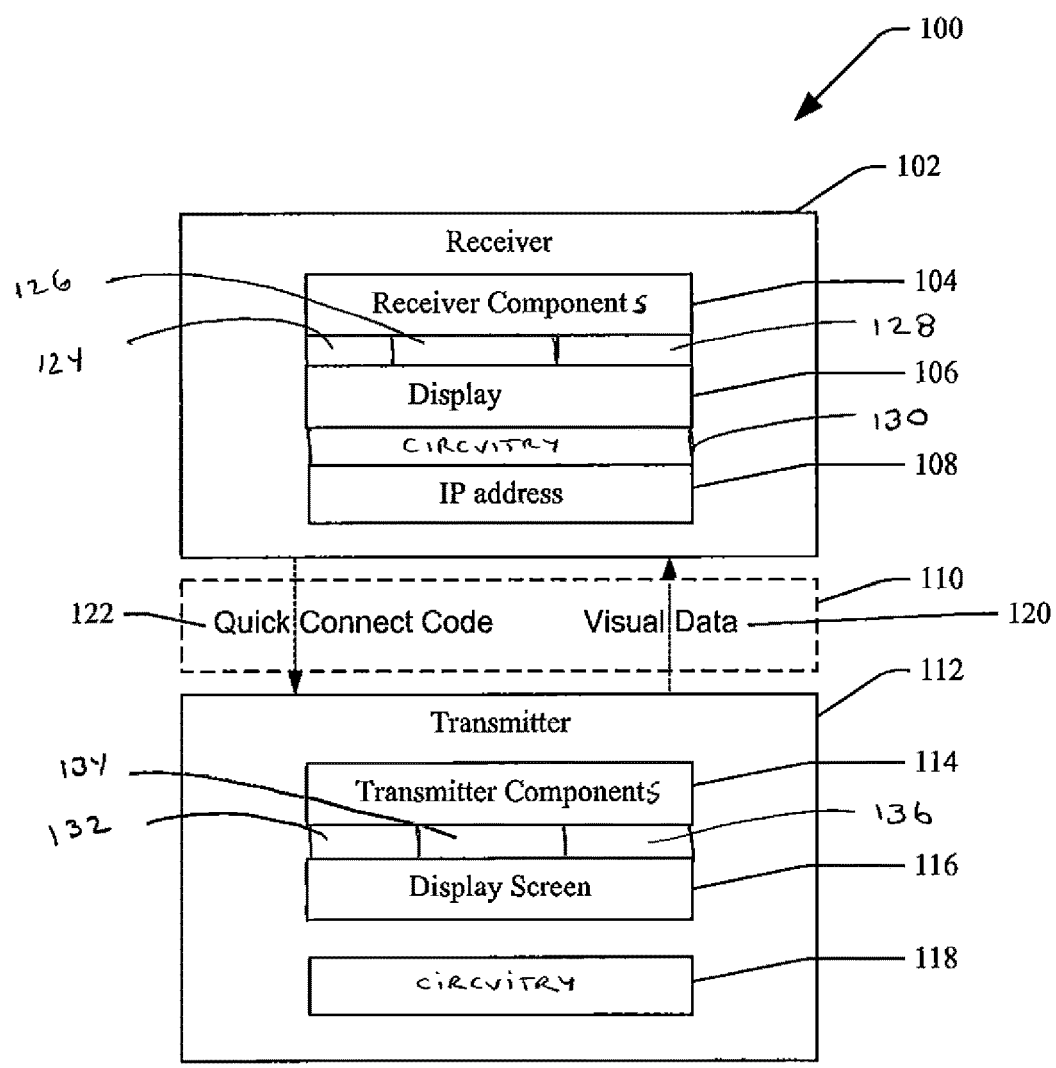
FIG. 1 is a schematic diagram of a system in which display outputs are provided through a display of a receiver responsive to data included in data bearing records.

Referring now to the drawings and particularly to FIG. 1, there is shown therein an exemplary embodiment of a system for providing display outputs responsive to data included in data bearing records generally indicated 100. The system includes a receiver schematically indicated 102. The receiver includes or is in operative connection with receiver components 104. Receiver components in exemplary embodiments include at least one input device 124. The at least one input device may include in exemplary arrangements, a keypad, a touch screen, a camera, a microphone, a wireless port or other suitable device for receiving user inputs. In exemplary embodiments, the receiver components also include output devices 126. Output devices include in exemplary embodiments, devices such as a visual display separately indicated 106. Other output devices in exemplary embodiments may include audio speakers, a printer, a wireless port or other device from which outputs may be provided. Exemplary receivers also include other components 128 as appropriate for the type of receiver device involved. For example in some exemplary embodiments such as when the receiver device is part of a video projector, the components may include light emitters, focus control devices, audio amplifier control devices or other suitable devices used in connection with a particular receiver.

The exemplary embodiment further includes receiver circuitry schematically indicated 130. In the exemplary arrangements, the receiver circuitry includes circuitry that corresponds to electrical circuits that are operative to enable the carrying out of the actions described herein. For example in some exemplary arrangements, the receiver circuitry may include processors that correspond to one or more of a combination of a CPU, FPGA, ASIC or other integrated circuit (IC) or other type of circuit that is capable of processing data and delivering and receiving signals. Further in the exemplary embodiment the receiver circuitry includes one or more data stores that correspond to one or more of volatile or non-volatile memories such as random access memory, flash memory, magnetic memory, optical memory, solid state memory or other devices that are operative to store instructions that can be executed and data. The instructions that may be executed can be in any of a plurality of different programming languages and formats and may include without limitation routines, subroutines, programs, threads of execution, objects, methodologies and functions which enable the receiver circuitry to carry out the actions such as those described herein. The structures associated with the receiver circuitry may include, correspond to and utilize the principles described in the textbook entitled *Microprocessor Architecture, Programming and Applications With the* 8085 by Ramesh S. Gaonker (Prentiss Hall, 2002) which is incorporated herein by reference in its entirety. Further it should be understood that exemplary embodiments of the receiver circuitry may include chipsets such as chipsets for enabling wireless communication, network interfaces and other suitable components for enabling the operation of the receiver in a manner described herein. Of course it should be understood that these circuitry structures are exemplary and in other embodiments, other circuit structures for operating, storing, processing, resolving and outputting signals and information may be used.

In the exemplary embodiment at least one data store associated with the receiver circuitry includes data corresponding to a network address. This network address may correspond to an IP address (such as a IPv4 dot decimal address). Such an address which is schematically indicated 108 may be used for enabling the receiver circuitry 130 to communicate in a network 110. Network 110 may in exemplary embodiments include a wired or wireless network. Further while in exemplary arrangements the network may include a local area network through which communication is accomplished via radio frequency (RF) communication exchanged via communication approaches such as Bluetooth or Near Field Communications (NFC), in other embodiments, communication may be carried out via wide area networks of the wired or wireless variety.

The exemplary system 100 further includes a transmitter 112. In the exemplary embodiment the transmitter includes transmitter components schematically indicated 114. Transmitter components in exemplary embodiments may include input devices 132. Input devices 132 may include, for example, a keypad, a touch screen input, a microphone, a wireless port, a camera or other devices suitable for receiving inputs. The exemplary transmitter further includes output devices 134. Output devices 134 include a display indicated separately 116 and may include as well audio speakers, wireless ports or other devices suitable for providing outputs from the transmitter. The transmitter 112 further includes other devices 136 which are other components included in the transmitter as appropriate for carrying out functions and operations of the particular transmitter.

The exemplary transmitter further includes transmitter circuitry 118. The transmitter circuitry may include structures such as those discussed in connection with the circuitry of the receiver 130. This includes circuits for executing instructions as well as circuitry for storing data, instructions and other information, and providing communication of signals via the network 110.

In the case of the circuitry 130 of the receiver and circuitry 118 of the transmitter, the instructions that are executable by the circuitry may be stored on one or more different types of media which is suitable for holding such instructions in a non-transitory form. This may include, for example, solid state drives, flash memory, hard drives, firmware, CDs, DVDs, RAM, ROM or other suitable media. The particular type of media used will depend on the requirements of the particular device and the nature of the instructions.

Further it should be understood that while in FIG. 1 the circuitry and associated components of the receiver and the transmitter are indicated respectively as integrated in the particular device, in some arrangements the transmitter or receiver device may be comprised of a plurality of separate components that are in operative connection and which perform the functions described herein.

Figure 2:
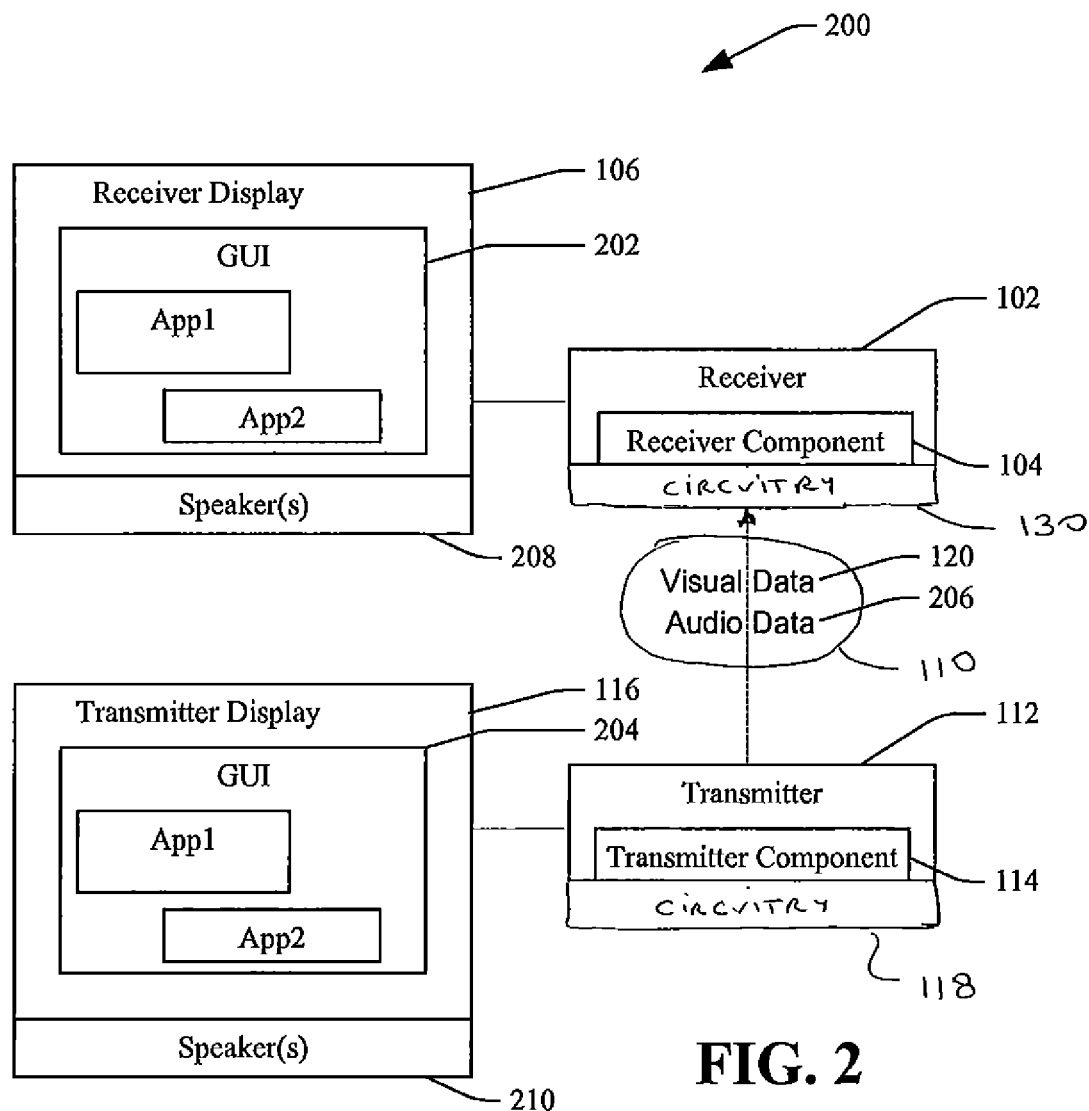
FIG. 2 is a schematic view showing the display of visual content on a display of a receiver which corresponds to visual content being provided on a display associated with a transmitter.

FIG. 2 represents an operational condition of the transmitter and the receiver generally indicated 200. In this exemplary arrangement, the transmitter 112 is operative responsive to the transmitter circuitry 118 to cause the visual outputs 204 to be presented on the display 116 associated with the transmitter. Further in this exemplary condition, circuitry 118 is operative to cause the output devices of the transmitter to output audio corresponding to the visual outputs 204. The output devices 134 include speakers 210 of the transmitter. In the exemplary arrangements, the visual outputs and audio outputs of the transmitter are enabled to be controlled by the operator of the transmitter through selective inputs through the input devices 132. In exemplary arrangements, such inputs may enable the operator of the transmitter to present visual and audio outputs of different types and in different arrangements responsive to the operation of the transmitter circuitry 118 and its corresponding executable instructions.

In exemplary arrangements, the circuitry 118 of the transmitter is operative to produce transmitter network signals 120 which correspond to the current display outputs on the display 116 of the transmitter. The control circuitry is also operative to produce transmitter network signals 206 which correspond to the current audio outputs through the speakers 210 of the transmitter. In the exemplary condition 200 represented in FIG. 2, the transmitter network signals are transmitted through the network 110 to the network address 108 associated with the receiver circuitry 130. The receiver circuitry is operative to receive the transmitter network signals and to use the network signals to cause visual outputs through the receiver display 106. The receiver circuitry is operative to cause visual outputs 202 to be output through the display 106 based on the received transmitted network signals 120 corresponding to visual data. In the exemplary arrangement, the visual outputs on the display 116 are substantially similar to the visual outputs displayed on the display 116 of the transmitter. In exemplary arrangements, the visual outputs of the receiver comprise generally the same visual content as is currently shown on the display of the transmitter, except that there may be differences with respect to a lower resolution, bit rate, additional pixelation or other characteristics which may lower the overall quality of the visual outputs through the display of the receiver, but which still enable users to perceive the overall visual outputs depicted concurrently in the visual outputs through the display of the transmitter.

Similarly in exemplary embodiments, the transmitter network signals 206 are used by the receiver circuitry 130 to produce audio outputs through speakers 208, which speakers are included among the output devices 126 of the exemplary receiver. In the exemplary arrangement the speakers 208 of the receiver are operative to output audio corresponding to the audio output currently being presented through the speakers 210 of the transmitter. Of course it should be understood that these approaches are exemplary and in other arrangements, other approaches may be used.

In exemplary embodiments, the visual outputs may include an entire graphical user interface such as a desktop, home screen, or one or more application screens that are output through the display of the transmitter. However, in other arrangements, the visual outputs may correspond to a selected portion of such video outputs. This may include, for example, content of a single application screen such as a window of a browser, an output from an app or a game, movie player or other source of visual outputs. Further it should be understood that in some exemplary embodiments, the receiver circuitry may include circuitry executable instructions corresponding to a browser or other applications that enable the receiver circuitry to output video and audio outputs through the display 106 and speakers 108 responsive to network signals received at the network address.

In some exemplary embodiments, the transmitter and receiver may be operated such that the visual and/or audio outputs currently being presented by the transmitter may be substantially mirrored by the visual outputs and audio outputs from the display 106 and speakers 208 of the receiver. Further in some exemplary arrangements, the transmitter circuitry 118, the receiver circuitry or both may be operated responsive to inputs through respective input devices to limit or prevent certain aspects of the outputs from the transmitter from being presented on the display and speakers associated with the receiver 102. For example, one or more inputs to input devices 132 of the transmitter may be operative to deactivate and/or mute/block certain selected visual content or audio content that is transmitted via the network signals to the receiver circuitry. In some exemplary arrangements, the deactivating or muting of video and/or audio content may be accomplished by inputs that are operative to shut off the display and speakers associated with the transmitter. In other arrangements, inputs through input devices of the transmitter may be operative to selectively enable portions of video outputs and/or audio outputs from the transmitter to be selectively transmitted and displayed through operation of the receiver circuitry.

Further in some exemplary arrangements, inputs through input devices may be operative to selectively mute/block the video or audio outputs from the transmitter while enabling the network signals to include such transmitted material and enable the video and audio outputs to be presented through the receiver device. This may be done in some exemplary arrangements to prevent the transmitter and the receiver from providing separate video and/or audio outputs in close proximity to one another, such as when both devices are being operated within the same room. The ability to selectively mute, block, discontinue or otherwise limit the distracting effect of both outputs occurring in close proximity may be helpful to making a more effective presentation through the receiver device.

In an exemplary embodiment, the receiver is operative to enable the transmitter to more readily communicate transmitted network signals to the network address associated with the receiver circuitry. In the exemplary embodiment, the receiver circuitry 130 operates in accordance with its programming in response to one or more inputs through associated input devices 124, to cause the receiver circuitry to generate a quick connect (QC) code value. In the exemplary arrangement the QC code value is generated through operation of the receiver circuitry by base encoding the network address 108 associated with the receiver circuitry. In an exemplary arrangement, the receiver circuitry is operative to produce a QC code value that has fewer characters than the network address. Further in exemplary arrangements, the QC code value includes alphabetical and numerical characters to facilitate the use of a QC code value that has substantially fewer characters than the normal network address.

For example in an exemplary embodiment the receiver circuitry 130 is operative to encode an IPv4 network address using base encoding to cause generation of the QC code value. In an exemplary arrangement, the receiver circuitry 130 is operative to use base30 encoding for purposes of generating the QC code value. Of course in other exemplary arrangements, other forms of base encoding may be utilized to produce a QC code value that it suitable for purposes of producing a shorter value than the network address that is more readily usable for purposes of establishing communication between the transmitter and the receiver.

For example in an exemplary embodiment, the IPv4 network address associated with the receiver component may be a network address such as 192.168.4.15. This is the network address utilized by the receiver 102 for communicating in the network 110. In the exemplary arrangement, the base30 encoding carried out through operation of the receiver circuitry 130 on the network address produces a QC code value of 76SDE8 which has only half the number of characters compared to the network address when the dot values of the original address are considered.

Figure 3:
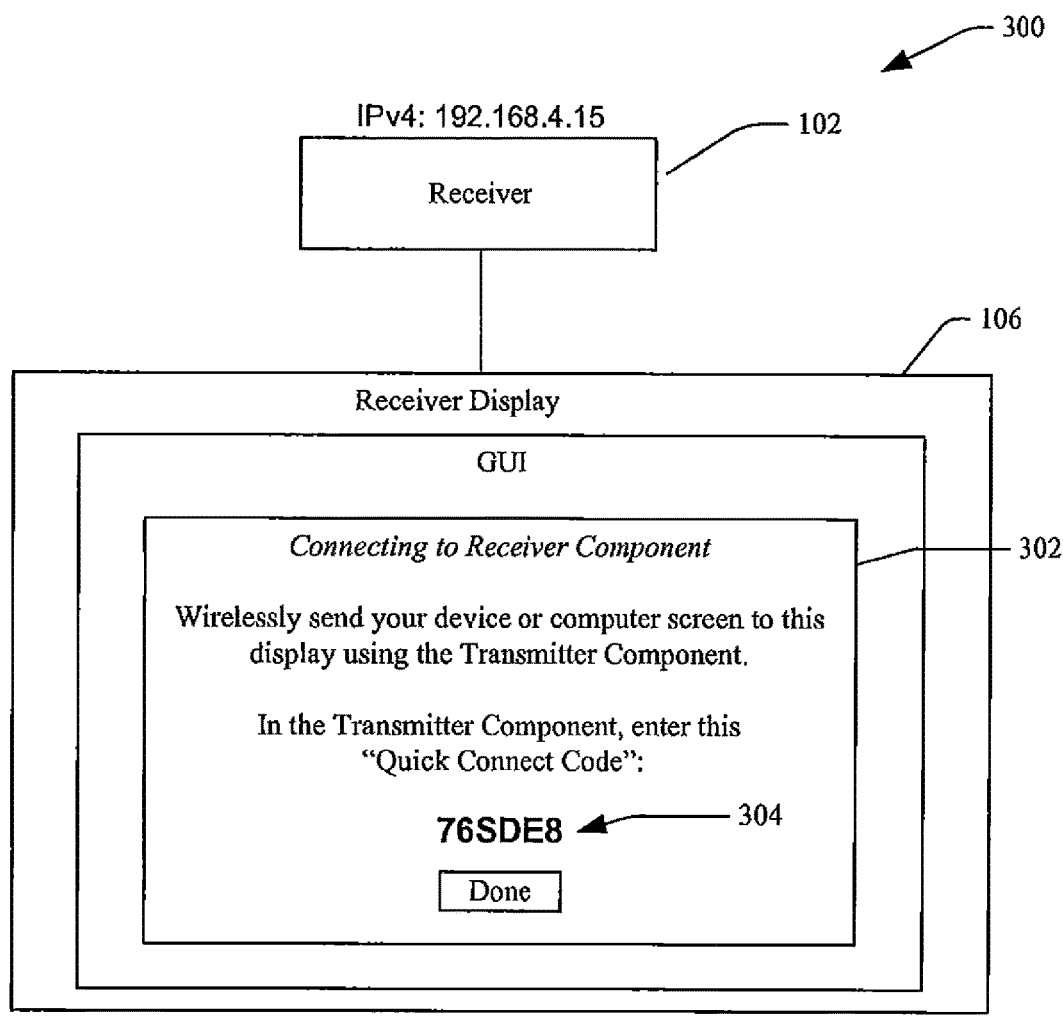
FIG. 3 is a schematic view showing the content of an exemplary data bearing record output through operation of receiver circuitry in a receiver.

Further in the exemplary embodiment the receiver circuitry 130 is operative to include the QC code value in at least one data bearing record that is produced responsive to operation of the circuitry. In the exemplary arrangement the at least one data bearing record including the QC code value is produced through operation of one of the output devices 126 associated with the receiver. For example in some arrangements the record may include at least one visually output record that is presented on the display 106 of the receiver. Such a configuration 300 of the receiver 102 is represented in FIG. 3 with the data bearing record being output through the display 106 associated with the receiver. In the exemplary arrangement the data bearing record 302 corresponds to a display window which includes the QC code value 304.

While in the exemplary arrangement shown in FIG. 3, the record 302 presents the QC code value and instructions for its use in human readable format, in other arrangements, the at least one record may present the QC code value data in alternative formats. Such alternative formats may include machine readable data such as 1 or 2 dimensional bar codes or other codes, as well as other forms of records which include the QC code value in a form that can be read and interpreted through operation of the machine.

Further in other exemplary embodiments, the one or more data bearing records including the QC code values may be produced on a different output device associated with the receiver. Such another output device may include for example a printer which is operative to produce media including the QC code value. In still other arrangements, the at least one data bearing record output through operation of the receiver circuitry may be in the form of wireless records that are output via a wireless port or similar output device of the receiver. Of course it should be understood that these approaches are exemplary of numerous different approaches that may be utilized.

Further it should be appreciated that the receiver circuitry may also be operative to include additional information in data bearing records with the QC code values. For example in some exemplary arrangements, such additional information may correspond to parameters that may be utilized by the transmitter circuitry to encode, modify or specify aspects of the transmitter network signals produced in response to the video and audio outputs presented at the transmitter. Such values may be utilized, for example, to modify features and properties of the video and/or audio outputs that enable the transmitter circuitry to send corresponding network signals that facilitate or enable the receiver circuitry to produce the corresponding video and audio outputs. For example in some exemplary embodiments the data bearing records may include data corresponding to resolution, frame rate, bit rate or other features of the transmitted network signals corresponding to the video or audio that is sent by the transmitter circuitry to the receiver circuitry.

In the exemplary arrangement the transmitter circuitry 118 includes data and instructions that enable the transmitter circuitry to resolve the network address associated with the receiver circuitry from the QC code value. Operating the transmitter device to receive the QC code value and other data included in the data bearing record delivered by the receiver enables the transmitter circuitry to resolve the network address of the receiver so that network signals corresponding to the current video and audio outputs from the transmitter may be sent through the network and received by the receiver circuitry.

In some exemplary arrangements, an input device 132 of the transmitter may include a camera. The camera may be operated responsive to the transmitter circuitry to capture an image of the record data including the QC value data. In some arrangements, this may include capturing the encoded data in a bar code or other machine readable formats or alternatively capturing the human readable value data output via a display, a printed record or other record format. In such exemplary arrangements, the transmitter circuitry may operate in accordance with its programming to resolve the QC code value data such as by using instructions suitable for interpreting the format of the characters included in the record. Such instructions may include character recognition software of various types that are capable of recognizing numerical and alphabetical characters that are included in QC code value data. In other arrangements, the instructions may include instructions which provide the capability of resolving the QC code value data and other data included in the record from machine readable indicia included in the record.

In other exemplary embodiments an input device 132 associated with the transmitter may include a microphone. The transmitter circuitry 118 may include instructions that are operative to interpret audio voice instructions and information that are received through the microphone. Thus in selected arrangements, the user may read aloud the QC code value or other data from the data bearing record which causes the transmitter circuitry to resolve the QC code value.

In other arrangements, one or more data bearing records produced by the receiver may be transmitted via a wireless output port or similar device to an input device such as a wireless input port of the transmitter. Such record data including the QC code value may be received and interpreted through operation of the transmitter circuitry to determine the data included therein.

Figure 4:
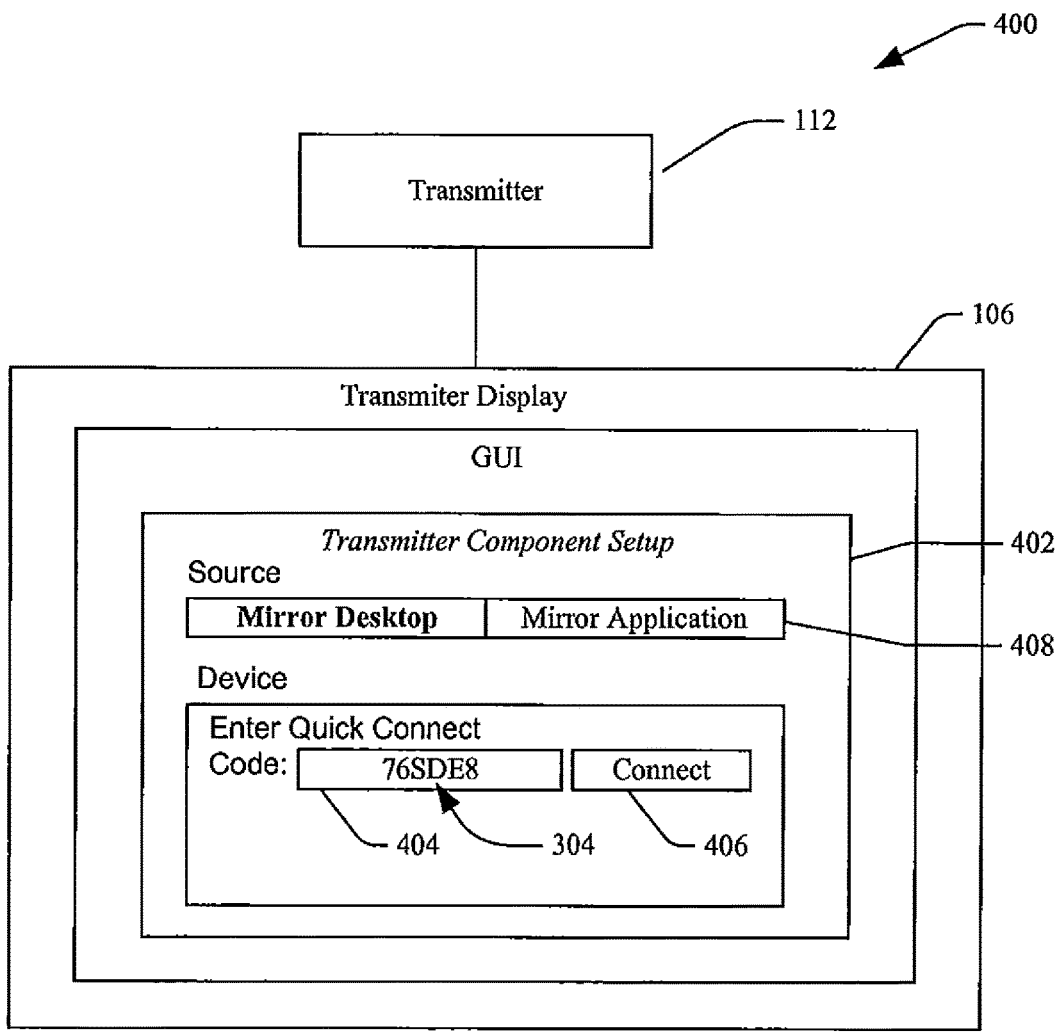
FIG. 4 is a schematic view of a transmitter operative to use data bearing record data to access the display of an exemplary receiver.

In still other arrangements, the transmitter may operate in the condition 400 schematically represented in FIG. 4 in which the transmitter circuitry is operative to present the user with a interface window 402 through the display 106 associated with the transmitter. The interface window 402 includes an input box 404 or other input interface through which the user may input the characters which comprise the QC code value 304. This may be done through inputs through an input device 132 of the transmitter such as a touch screen or other keypad. Further in the exemplary interface window, the user may be presented with a function button such as a connect button 406 which the user may select to initiate communication between the transmitter and the receiver.

In this exemplary arrangement, the user input via selection of the connect button 406 is operative to cause the transmitter circuitry 118 to operate to resolve the network address associated with the receiver. Further in exemplary arrangements the transmitter circuitry 118 may operate to initiate communication with the receiver circuitry 130 at the network address. This may include, for example, a handshaking protocol to establish communication as well as initiating of pairing and exchange of information. This may also include, for example, the transmission by the transmitter circuitry of signals to the receiver circuitry which indicate a network address associated with the transmitter. This enables the receiver circuitry and the transmitter circuitry to engage in two-way communication which enables synchronous communication.

Further in the exemplary arrangement shown in FIG. 4, the interface window includes a user interface selection button 408. The exemplary interface selection button enables a user to select (via operation of an input device) whether the transmitter should transmit transmitter network signals based on the entire visual outputs that are presented on the display of the transmitter, or based on only a portion of the visual output from the display of the transmitter such as an application window or other selected feature that may not take up the entire area of the transmitter screen.

Further as discussed previously, if additional parameters are encoded in the data associated with the data bearing record along with the QC code value, the transmitter circuitry is operative to decode such values. The transmitter circuitry is then operative to generate transmitter network signals associated with the video outputs and/or audio outputs as appropriate based on the parameters included in the data bearing record.

In exemplary embodiments, the transmitter and receiver may be operative to send or receive video and/or audio data over a wired or wireless IP based network. This may include, for example, a wired Ethernet network or an IEEE 802.11a, b, g, n, ac type wireless network. Of course it should be understood that in other arrangements, other types of wired or wireless communications may be utilized between the transmitter and receiver.

Figure 5:
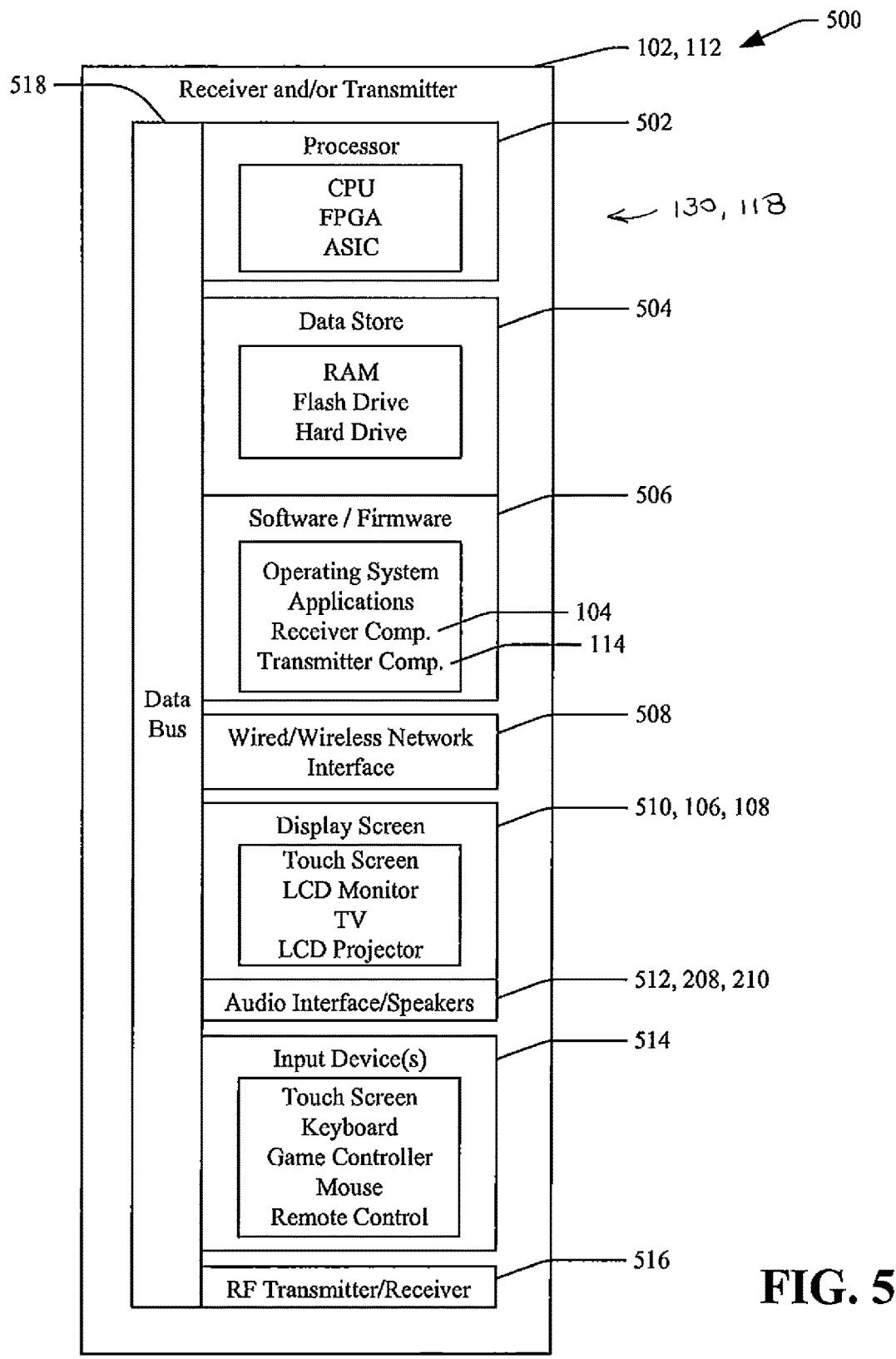
FIG. 5 is a schematic view of exemplary components that may be included in receiver circuitry of a receiver of an exemplary embodiment, or alternatively in transmitter circuitry of a transmitter of exemplary embodiments.

FIG. 5 represents a high level schematic view of components that may be included in connection with the circuitry of an exemplary transmitter 112 or exemplary receiver 102. In this exemplary schematic view, the circuitry 130, 118 has a configuration generally indicated 500. It should be understood that this configuration is exemplary of numerous different types of configurations that may be utilized in connection with such circuitry.

For example in this exemplary arrangement of the circuitry, at least one processor 502 is included in the circuitry. As previously discussed, the circuitry including processors may include hardware circuits, software and/or firmware to carry out executable instructions. For example, processors may correspond to one or more or a combination of a CPU, FPGA, ASIC or any other form of integrated circuit (IC) or other type of circuit that is suitable for use in connection with the control circuitry.

In addition, the exemplary circuitry includes at least one data store schematically indicated 504. In the exemplary arrangement the data store includes a medium that is suitable for holding non-transitory executable instructions that may be carried out through operation of the circuitry. Exemplary types of such media may include RAM, ROM, flash memory, a magnetic hard drive, optical storage media, solid state storage media or any other form of volatile or non-volatile storage media that is operative to store instructions and/or data.

The exemplary circuitry 130, 118 further includes executable instructions and data schematically indicated 506 which make up an operating system and one or more applications. Such instructions may include drivers or interfaces or other appropriate instructions that are suitable to provide drivers and/or interfaces for receiver components 104 or transmitter components 115 as used in the particular circuitry.

Further, the exemplary circuitry may further include a suitable wired or wireless network interface schematically represented 508. Such a network interface may include hardware or executable instructions and may provide for example an Ethernet network interface, an IEEE 802.11 type wireless signal transceiver, network cards or other suitable interface that provides communication of the network signals over the appropriate wired or wireless networks utilized in connection with exemplary embodiments. Further as previously discussed, the exemplary circuitry may include suitable drivers and interfaces 510 that enable driving and producing outputs through displays such as display 106 of the receiver and display 108 in the case of the transmitter. Of course in the case of the receiver, the display interface may include an appropriate interface for the type of display that is being utilized. For example an interface that is suitable for providing signals suitable for producing outputs to an LCD projector, OLED monitor or other device that is utilized in operative connection with the receiver.

Further in exemplary arrangements, the circuitry includes an audio interface 512. In the exemplary arrangement the audio interface 512 is operative to provide an interface in the case of the transmitter to speakers 210 and in the case of the receiver, the speakers 208. Such audio interface 512 may also be suitable for connection to different types of audio output devices and speaker systems. This may include, for example, surround sound type systems or systems that provide outputs through speakers that are perceived by users in different locations so as to render corresponding sounds associated with visual outputs that appear in different locations through the visual output screen or other visual output device. Of course these approaches are exemplary and in other arrangements, other approaches may be used.

In the exemplary embodiment the circuitry further includes interfaces 514 for input devices such as input devices 124 of the receiver and input devices 132 of the transmitter. The input device interfaces are suitable for the types of input devices that may be utilized in connection with the particular transmitter or receiver. This may include interface devices such as a touch screen, a keyboard, a mouse, a game controller, remote control, camera or other type of input device including an input device through which the QC code values associated data bearing records may be received through operation of the transmitter.

In the exemplary circuitry, wireless transmitter/receiver components schematically indicated 516 are included. The wireless interface components 516 are utilized to enable the associated circuitry of the transmitter or receiver to communicate wirelessly via RF communications in a wireless network in the manner like that described herein. Further the exemplary circuitry includes one or more buses 518 and other circuits that are operative to provide pathways through which data signals can be communicated between the described different components which make up the circuitry. Of course it should be understood that these components that are described as utilized in the circuitry 130 of the receiver and circuitry 118 of the transmitter are exemplary, and in other embodiments other components, features and functions may be provided.

In an exemplary embodiment, the transmitter circuitry and the receiver circuitry may operate to carry out an audio/visual protocol therebetween in order to communicate the described communication of network signals including video and/or audio data between the transmitter and receiver. Such an audiovisual protocol may correspond to a protocol that is compatible with the Apple® AirPlay protocol. The Apple® AirPlay protocol is employed by Apple® hardware such as Apple® TV, an Apple® iPhone or other AirPlay compatible devices to enable AirPlay devices to mirror outputs on a display of an AirPlay compatible device to a display screen such as a TV that is connected to the Apple® TV.

In exemplary embodiments, the receiver may correspond to a device other than an Apple® TV that is operative to carry out features and functions similar to that which can be carried out with an Apple® TV with respect to receiving and displaying AirPlay signals from a computing device such as an iPhone or other Apple® device. An example of such a receiver may be achieved through instructions included in a software application known as Reflector™ software which is distributed by Squirrels, LLC of North Canton, Ohio. In an exemplary arrangement the Reflector™ software may include the capability to generate an output including the QC code values included in the data bearing records described herein.

Further in other exemplary embodiments, the transmitter may correspond to devices such as a purpose specific device or a mobile phone, laptop, tablet or desktop computer that is operative to carry out features similar to the AirPlay functionality of an Apple® iPhone with respect to transmitting video and audio signals via the AirPlay protocol from an Apple® iPhone to an Apple® TV. An example of computer executable instructions that enable such capabilities includes the AirParrot transmitter software provided by Squirrels, LLC of North Canton, Ohio. In exemplary embodiments the AirParrot software may be operated in a device that receives an input of the QC code value and operates to resolve the network address such as an IPv4 address usable to connect (e.g. pair via the AirPlay protocol) with devices operating the Reflector™ software or other receiver software.

It should be appreciated, however, that in alternative embodiments the transmitter and receiver may use other video and/or audio streaming protocols to reproduce video and/or audio content from the transmitter at the receiver. For example other protocols that may be adapted to utilize the QC code value process described herein include the virtual network computing (VNC) system which includes the remote frame buffer (RFB) protocol and the remote desktop (RDP) protocol. Further it should be understood that while the implementations of the exemplary embodiment described include using network addresses in an IPv4 format, other types of network addressing formats may also be utilized in other exemplary embodiments.

Figure 6:
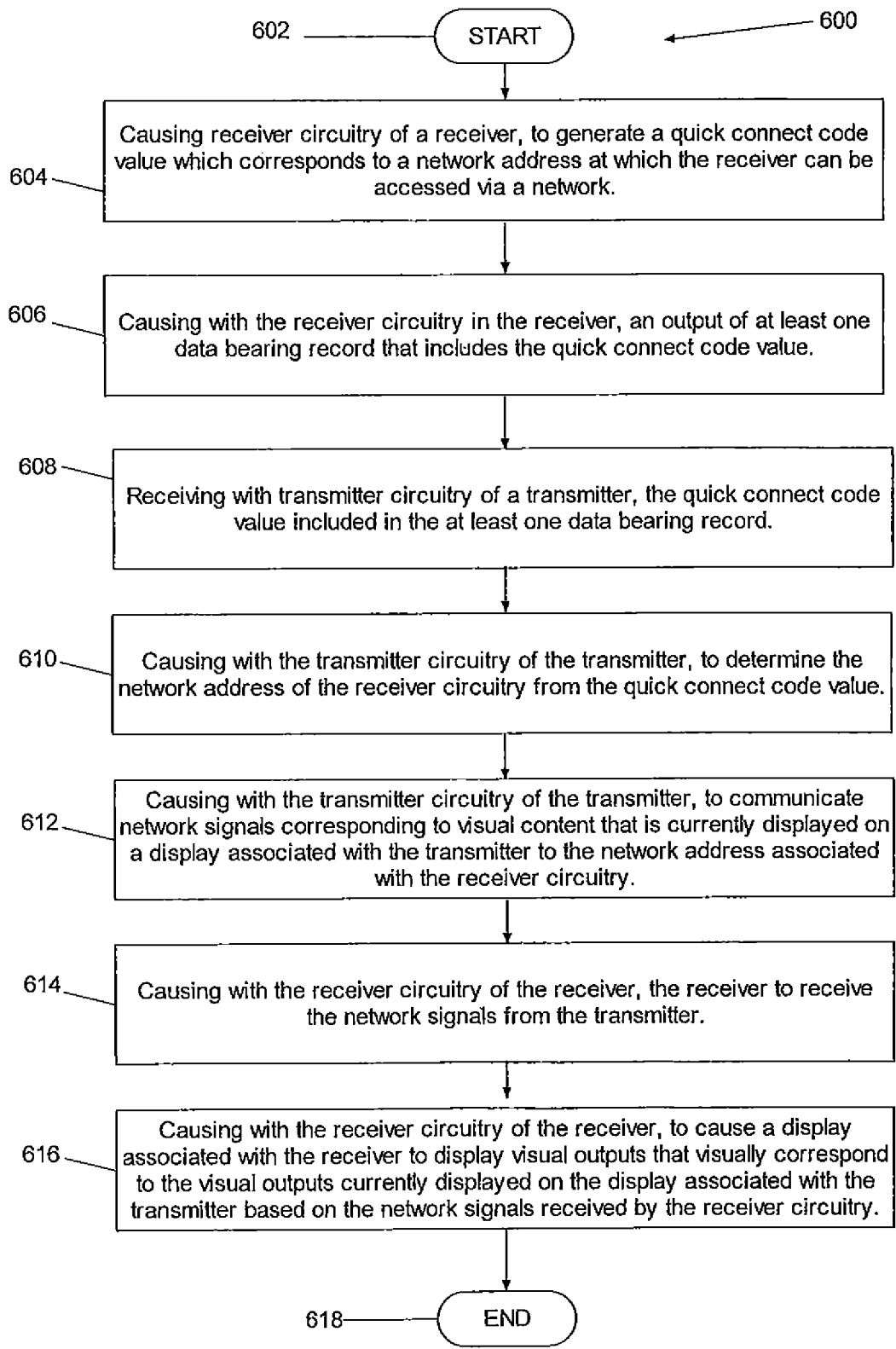
FIG. 6 is a schematic view of a logic flow diagram that represents an exemplary methodology associated with an exemplary embodiment.

FIG. 6 schematically shows an exemplary logic flow 600 associated with the operation of the exemplary receiver and transmitter. While this schematic representation is described as a series of acts that are performed in a sequence, it is to be understood that embodiments which implement the principles that are described herein are not limited to any particular order or the sequence or the acts that are described. Further in some arrangements acts may occur in a different order than is described in FIG. 6. In addition, one act may incur concurrently with another act. Numerous different methods may be carried out by employing the principles that have been described herein.

The exemplary logic flow enables connecting the transmitter and the receiver over a network to enable the current video and/or audio outputs of the transmitter to be reproduced on the display and through the speakers of the receiver. The method begins at a step 602. At a step 604, the receiver circuitry operates to generate the QC code value which corresponds to the network address at which the receiver can be accessed through the network. As previously discussed, step 604 in an exemplary embodiment is carried out responsive to one or more inputs through one or more input devices 124 associated with the receiver.

At a step 606, the receiver circuitry is operative to cause an output of at least one data bearing record which includes the QC code value. As previously discussed, the data bearing record may be presented in numerous different forms and may include additional parameter data which is usable in connection with the transmitter circuitry to produce the network signals usable by the receiver to present the visual outputs and/or audio outputs.

At a step 608, the transmitter circuitry is operative to receive the data from the data bearing record with the QC code value included therein. At a step 610, the transmitter circuitry is operative to use the QC code value to determine the network address associated with the receiver circuitry. At a step 612, the transmitter circuitry operates to communicate network signals corresponding to visual content that is currently being displayed on the display associated with the transmitter, to the network address associated with the receiver circuitry. Also as discussed, the transmitter circuitry may operate to transmit network signals corresponding to current audio outputs from the transmitter. Of course as previously described, these outputs which are to be presented through the receiver, may in some embodiments be controlled by inputs of a user through input devices of the transmitter.

As represented in step 614, the receiver circuitry is operative to receive the network signals at the network address. In step 616, the receiver circuitry operates to cause the display associated with the receiver to display visual outputs that correspond to the visual outputs currently being presented on the display of the transmitter based on the network signals received by the receiver circuitry. Of course as can be appreciated, this methodology may be ongoing such that the outputs from the transmitter may be presented through the display and/or speakers associated with the receiver on an ongoing basis as the outputs of the transmitter change with time. Further in some exemplary arrangements, other or additional transmitter devices may be able to communicate with the receiver so as to enable the presentation of the outputs from such other transmitters through the receiver. This may be done in some arrangements either concurrently or sequentially at different times depending on the operation of the receiver and the circuitry therein. The methodology described in FIG. 6 is carried out until it is ended at a step 618.

It should be mentioned that while the exemplary embodiments herein have been described with regard to certain components, other components may be used in other embodiments and that the functionality carried out by a single component as described in connection with an embodiment described herein may be carried out through the operation of multiple components in other embodiments. Likewise the functions and operations carried out by multiple components as described herein may be carried out in other arrangements by a single component. Further while examples have been provided for purposes of explanation, it is to be understood that these are exemplary embodiments and are not to be construed as limiting the hereto appended claims. Additionally it should be recognized that the examples provided herein may be modified or permutated while still falling within the scope of the claims.

Thus the exemplary embodiments achieve improved operation, eliminate difficulties encountered in the use of prior devices and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the inventive aspects are not limited solely to the features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description, or mere equivalents thereof.

The term "non-transitory" with regard to computer readable media is intended to exclude only the subject matter of a transitory signal, per se. The term "non-transitory" is not intended to exclude any other form of media with executable instructions, including but not limited to media comprising data that is only temporarily stored or stored in a transitory fashion.

Having described the features, discoveries and principles of the exemplary embodiments, the manner in which they are constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:
a system permitting access to a receiver display responsive to data included in at least one data bearing record, including:
a receiver comprising a video projector or a video monitor, wherein the receiver includes
at least one receiver input device,
at least one receiver output device including a receiver display of the video projector or video monitor,
receiver circuitry,
wherein the receiver circuitry is in operative connection with the at least one receiver input device and the receiver display, and is operative to
enable communication by the receiver circuitry in a network, wherein the receiver circuitry is associated in the network with a network address,
a transmitter comprising a mobile phone, laptop or a tablet, wherein the transmitter includes
at least one transmitter input device,
at least one transmitter output device including at least one transmitter display of the mobile phone, laptop or tablet,
transmitter circuitry,
wherein the transmitter circuitry is in operative connection with the transmitter display and the at least one transmitter input device, and is operative to enable communication by the transmitter circuitry in the network,
wherein the receiver circuitry is configured to cause
responsive at least in part to at least one input through the at least one receiver input device and the network address, generation of a quick connect (QC) code value, wherein the QC code value corresponds to the network address but includes less characters than the network address,
the QC code value to be included in at least one data bearing record,
the at least one data bearing record to be output through the at least one receiver output device,
the receipt of network signals in the network by the receiver circuitry at the network address, and
the network signals to be used by the receiver circuitry to produce receiver display signals usable to cause visual outputs through the at least one receiver display,
wherein the transmitter circuitry is configured to cause
responsive at least in part to receipt of the QC code value, the network address associated with the receiver circuitry to be resolved,
transmitter network signals to be produced corresponding to current transmitter display outputs through the transmitter display, and
transmitter network signals to be sent to the network address,
wherein the receiver display is enabled to provide visual outputs through the receiver display that correspond to the current transmitter display outputs.

2. A method comprising:
(a) receiving through an input device of a receiver including a receiver display and receiver circuitry, at least one input, wherein the receiver comprises a video projector or a video monitor,
(b) operating the receiver circuitry responsive at least in part to the at least one input, to generate a QC code value, which QC code value corresponds to a network address of the receiver circuitry, but which includes less characters than the network address,
(c) operating the receiver circuitry to produce at least one data bearing record output through a receiver display of the video projector or video monitor, the at least one data bearing record including the QC code value,
(d) operating the receiver circuitry to receive network signals at the network address in a network from a transmitter comprising a mobile phone, laptop or a tablet and including a transmitter display, wherein transmitter circuitry of the transmitter is operative to resolve the network address responsive at least in part to the QC code value, and wherein the network signals correspond to current transmitter visual outputs from the transmitter display,
(e) operating the receiver circuitry to cause visual outputs corresponding to the current transmitter visual outputs from the transmitter display to be concurrently visually output through the receiver display.

3. The method according to claim 2
wherein in (b) generating the QC code value includes base encoding the network address.

4. The method according to claim 3 and further comprising:
prior to (d)
(f)(i) receiving through at least one input device of the transmitter, the QC code value included in the at least one data bearing record,
(f)(ii) operating the transmitter circuitry to resolve the network address of the receiver circuitry responsive at least in part to the QC code value,
(f)(iii) operating the transmitter circuitry to send the transmitter network signals corresponding to the current transmitter visual outputs to the network address.

5. The method according to claim 4
wherein in (f)(iii) the transmitter network signals are transmitted wirelessly.

6. At least one non-transitory medium including instructions which are executable by circuitry to carry out operations comprising:
with transmitter circuitry associated with a transmitter comprising a mobile phone, a laptop or a tablet which includes a transmitter display, to cause
(a) the transmitter circuitry to receive a QC code value through at least one transmitter input device associated with the transmitter, wherein the QC code value has been output by an output device of a receiver comprising a video projector or a display monitor which includes a receiver display,
(b) the transmitter circuitry to resolve a network address associated with receiver circuitry of the receiver responsive at least in part to the QC code value,
(c) the transmitter circuitry to generate network signals corresponding to current visual outputs from the transmitter display, and
(d) the transmitter circuitry to send the network signals to the network address associated with the receiver circuitry,
wherein the receiver circuitry is operative to receive the network signals from the transmitter at the network address, which network signals are usable by the receiver circuitry to produce receiver visual outputs through the receiver display which receiver visual outputs correspond to the concurrent visual outputs from the transmitter display.

7. The at least one medium according to claim 6 wherein the operations further include
with the receiver circuitry associated with the receiver, to cause
(e) responsive to at least one input through at least one input device of the receiver, the receiver circuitry to generate the QC code value, wherein the QC code value corresponds to the network address at which the receiver circuitry receives the network signals which the receiver circuitry uses to produce receiver visual outputs through the receiver display,
(f) the receiver circuitry to output the QC value code through an output device of the receiver.

8. At least one non-transitory medium including instructions which are executable circuitry to carryout operations comprising:
with receiver circuitry associated with a receiver comprising at least one of a video projector or a video monitor including a receiver display, to cause
(a) responsive to at least one input through at least one input device of the receiver, the receiver circuitry to generate a QC code value, wherein the QC code value corresponds to a network address at which the receiver circuitry receives network signals which the receiver circuitry uses to produce receiver visual outputs through the receiver display,
(b) the receiver circuitry to generate at least one data bearing record that includes the QC code value,
(c) the receiver circuitry to output the at least one data bearing record through an output device associated with the receiver,
wherein in (a) the network signals correspond to current transmitter visual outputs through a transmitter display of a transmitter, which transmitter comprises a mobile phone, a laptop or a tablet that includes the transmitter display, wherein the transmitter includes transmitter circuitry that receives the QC code value included in the at least one data bearing record and utilizes the QC code value to resolve the network address, and which transmitter circuitry generates the network signals corresponding to the current transmitter visual outputs from the transmitter display and sends them to the network address whereby the receiver visual outputs from the receiver display correspond to the concurrent transmitter visual outputs.

9. The at least one medium according to claim 8 wherein the operations further include
with the transmitter circuitry associated with the transmitter, to cause
(d) the transmitter circuitry to receive the QC code value included in the at least one data bearing record through at least one transmitter input device associated with the transmitter,
(e) the transmitter circuitry to resolve the network address associated with the receiver circuitry responsive at least in part to the QC code value,
(f) the transmitter circuitry to generate the network signals corresponding to the current transmitter visual outputs, and
(g) the transmitter circuitry to send the network signals to the network address.

10. Apparatus comprising:
a system permitting access to a video projector display, including:
a video projector, wherein the video projector includes at least one video projector input device,
at least one video projector output device including the video projector display and,
video projector circuitry,
wherein the video projector circuitry is in operative connection with the at least one video projector input device and the at least one video projector output device, and is operative to enable communication by the video projector circuitry in a network, wherein the video projector circuitry is associated in the network with a network address,
a mobile phone, wherein the mobile phone includes
at least one mobile phone input device,
at least one mobile phone output device including a mobile phone display,
mobile phone circuitry,
wherein the mobile phone circuitry is in operative connection with the mobile phone display and the at least one mobile phone input device, and is operative to enable communication by the mobile phone circuitry in the network,
wherein the video projector circuitry is configured to cause
responsive at least in part to at least one input through the at least one video projector input device and the network address, generation of a quick connect (QC) code value, wherein the QC code value corresponds to the network address but includes less characters than the network address,
the QC code to be output through the at least one video projector output device,
the receipt of network signals in the network by the video projector circuitry at the network address, and
the network signals to be used by the video projector circuitry to produce video projector display signals usable to cause visual outputs through the video projector display,
wherein the mobile phone circuitry is configured to cause
responsive at least in part to receipt of the QC code value, the network address associated with the video projector circuitry to be resolved,
mobile phone network signals to be produced corresponding to current mobile phone display outputs through the mobile phone display, and
mobile phone network signals to be sent to the network address,
wherein the video projector display is enabled to provide visual outputs corresponding to the current mobile phone display outputs.

11. The apparatus according to claim 10
wherein the network address includes only numerical characters and the QC code value includes alphabetical and numerical characters.

12. The apparatus according to claim 10
wherein the QC code value is produced by the video projector circuitry through base encoding of the network address.

13. The apparatus according to claim 10 wherein the QC code value is produced by base30 encoding the network address.

14. The apparatus according to claim 10
wherein the QC code value is output through the video projector display.

15. The apparatus according to claim 14
wherein the at least one mobile phone input device comprises a camera, and
wherein the QC code value is provided to the mobile phone circuitry through operation of the camera.

16. The apparatus according to claim 14
wherein the at least one video projector input device comprises a video projector keypad, and wherein the video projector circuitry is operative to output the QC code value responsive to at least one input through the video projector keypad.

17. The apparatus according to claim 14
wherein the at least one video projector input device includes a video projector microphone, and wherein the video projector circuitry is operative to recognize a word command corresponding to sounds received by the microphone, and wherein the QC code value is resolved by the video projector circuitry responsive at least in part to the received word command.

18. The apparatus according to claim 14
wherein the network comprises a wireless network and the mobile phone network signals include wireless signals.

19. The apparatus according to claim 18
wherein the mobile phone network signals include at least one of Bluetooth signals and NFC signals.

20. The apparatus according to claim 14
wherein the at least one video projector output device includes a video projector audio speaker,
and wherein the at least one mobile phone output device includes a mobile phone audio speaker,
and wherein the mobile phone audio outputs from the mobile phone audio speaker are output concurrently with the current mobile phone display outputs,
wherein the mobile phone network signals are additionally operative to cause the video projector circuitry to cause audio outputs corresponding to the mobile phone audio outputs to be output from the video projector audio speaker.

21. The apparatus according to claim 20
wherein the mobile phone circuitry is associated with a mobile phone network address, and wherein the mobile phone network signals include data corresponding to the mobile phone network address,
wherein the video projector circuitry is operative to resolve the mobile phone network address responsive at least in part to the mobile phone network signals, and cause at least one video projector network signal to be sent to the mobile phone circuitry through the network to the mobile phone network address.

22. The apparatus according to claim 21
wherein the mobile phone circuitry is operative responsive at least in part to the at least one video projector network signal to send further mobile phone network signals to the video projector circuitry.

23. The apparatus according to claim 10
wherein the QC code value is output through the video projector display, and the at least one mobile phone input device comprises a mobile phone keypad, and wherein the QC code value is provided to the mobile phone circuitry through at least one input through the mobile phone keypad.

\* \* \* \* \*